Dec. 13, 1932.   P. F. BOEYE   1,890,965
BOX
Filed Feb. 28, 1931   3 Sheets-Sheet 1

Inventor
Paul F. Boeye
By Caswell & Lagaard
Attorneys

Dec. 13, 1932.   P. F. BOEYE   1,890,965
BOX
Filed Feb. 28, 1931   3 Sheets-Sheet 2

Inventor
Paul F. Boeye
By Caswell & Lagaard
Attorneys

Dec. 13, 1932.  P. F. BOEYE  1,890,965
BOX
Filed Feb. 28, 1931  3 Sheets-Sheet 3

Inventor
Paul F. Boeye
By Caswell & Lagaard
Attorneys

Patented Dec. 13, 1932

1,890,965

UNITED STATES PATENT OFFICE

PAUL F. BOEYE, OF ST. PAUL, MINNESOTA, ASSIGNOR TO WALDORF PAPER PRODUCTS COMPANY, OF ST. PAUL, MINNESOTA, A CORPORATION OF MINNESOTA

BOX

Application filed February 28, 1931. Serial No. 519,047.

My invention relates to boxes and particularly to dividers used in conjunction therewith and has for an object to provide removable dividers whereby the box may be divided into two or more pairs of compartments.

Another object of the invention resides in providing the box with intersecting dividers and in constructing some of the dividers as tabs extending toward one another from opposite walls of the box.

A still further object of the invention resides in forming said tabs with doubled over parts adapted to present smooth, round, exposed edges to readily guide the objects into the compartments when inserted into the box, and to further construct said dividers with base members extending outwardly from said tabs on either side thereof and to rest upon the wall of the box on which the divider is disposed.

Another object of the invention resides in constructing the other divider with slots adapted to receive the first named dividers and for holding the outstanding tabs of said first named dividers in proper position.

A feature of the invention resides in providing means within the box for holding the doubled over parts of the tab of the divider in contact with one another.

An object of the invention resides in constructing the box with portions adapted to engage the edges of the base members of the first named dividers to hold the same in proper position.

An object of the invention resides in constructing the second named divider of a length equal to the length of the box so as to hold the first named dividers in proper position within the box.

A feature of the invention resides in constructing the combined length of the base members of the first named dividers equal to the length of the box to hold the doubled over parts of the outstanding portions thereof together.

Other objects of the invention reside in the novel combination and arrangement of parts and in the details of construction hereinafter illustrated and/or described.

Figure 1:
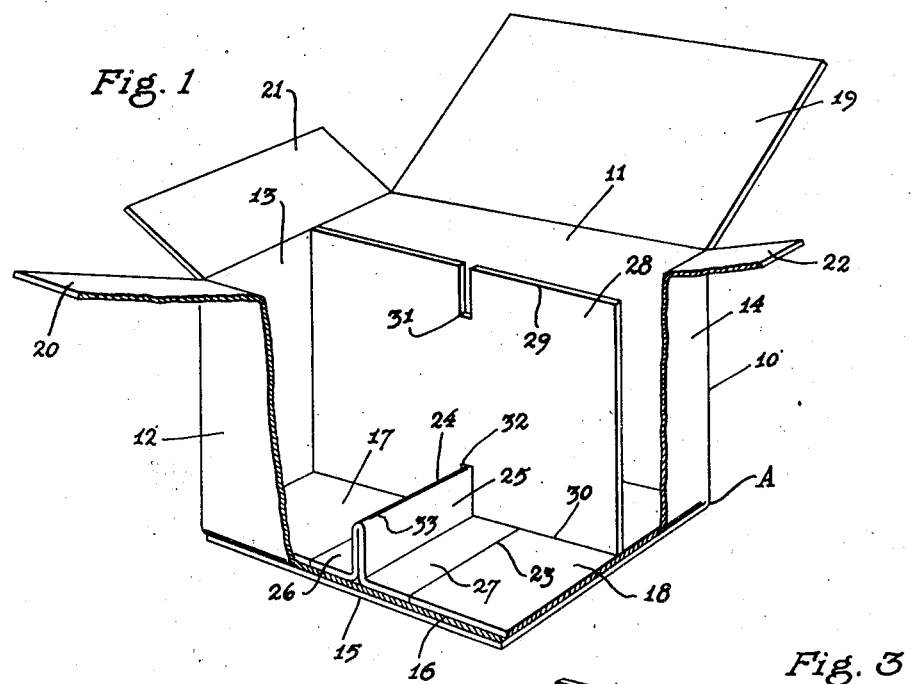
Fig. 1 is a perspective view of a box with the cover thereof open and with portions broken away and illustrating an embodiment of my invention.
Figure 2:
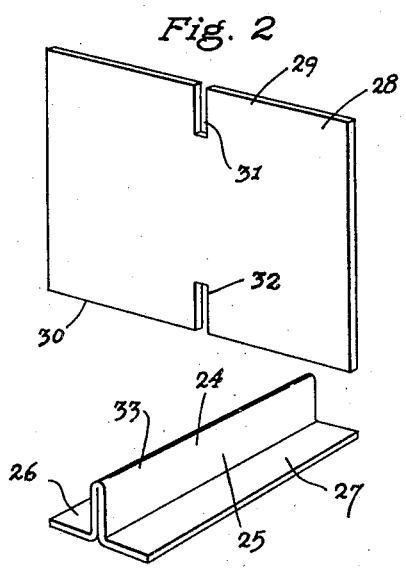
Fig. 2 is a perspective view of the dividers of the invention detached from the box and separated from one another.

For the purpose of illustrating the application of my invention, I have shown in Fig. 1 an ordinary paper box, which I have indicated in its entirety at A. This box comprises a body portion 10, which is constructed with side walls 11 and 12, and end walls 13 and 14, adapted to be secured together at one of the corners of the box in any well known and suitable manner. The walls 11, 12, 13 and 14 have issuing outwardly from corresponding ends thereof, flaps 15, 16, 17 and 18, which are adapted to be folded into a common plane to form a bottom for the box. In a similar manner, the other ends of the walls have extending outwardly therefrom, flaps 19, 20, 21 and 22, which may be folded into a common plane to form a closure for the box. The flaps 15, 16, 19 and 20 are of substantially the same size as the bottom or top of the box while the flaps 17, 18, 21 and 22 fall short of one another to leave intervening spaces therebetween indicated at 23. The various flaps of the box are connected together by glueing or otherwise when the box is erected and desired for use.

In conjunction with the box A, two dividers 24 are used, which are mounted within the spaces 23 and extend from the top and bottom of the box toward one another. These dividers are each constructed from a sheet of material doubled back upon itself to form an outstanding tab or divider portion 25 and to provide base members 26 and 27 extending at right angles to the tab and lying in a common plane. The combined width of these base members is substantially equal to the width of the space 23 so that the divider may be placed with the base members 26 and 27 disposed in said space and with the edges thereof in contact with the edges of flaps 17, 18, 21 and 22. When the dividers 24 are properly positioned between the respective flaps of the box, they form oppositely extending tabs which lie in a common plane and which serve to separate the articles placed within the box.

In conjunction with the dividers 24, another divider 28 is employed which is constructed of a single sheet of material. This divider is of the same height as the box and may be of the same length. If desired however, this divider may be considerably shorter than the length of the box when round cans or similar objects are to be placed within the various compartments within the box. This divider is adapted to be positioned at right angles to the two dividers 24. At proper positions along the upper and lower edges 29 and 30 divider 28, are formed opposed aligning slots 31 and 32, which are of a height substantially equal to the height of the tabs 25 and which are of a width equal to the combined thickness of the parts of said tabs. When the divider 28 is placed within the box, the said tabs are received within the slots 31 and 32 and held in a position at right angles to the base members 26 and 27 thereof.

Although I have shown the base members 26 and 27 of the divider 24 abutting against the edges of the flaps 17 and 18 of the box, it can readily be comprehended that where a fairly long box is employed that the flaps 17 and 18 may fall short of the base members 26 and 27 to leave spaces therebetween. In such case, the divider 28 would be constructed of a length equal to the length of the box and would serve through the notches 31 and 32 to hold the dividers 24 in proper position to receive cans or other articles to be placed within the box. Such construction is particularly advantageous where economy of material is important.

In the use of the box, which ordinarily comes in collapsed form, the bottom is first erected by folding the flaps 17 and 18 inwardly and by then folding the flaps 16 and 15 thereon, the parts being glued together to hold the same in place. This leaves the space 23 between the flaps 17 and 18 within the interior of the box. One of the dividers 24 is next folded into erected position and the base members 26 and 27 thereof inserted within the space 23 in the bottom of the box. The divider 28 is next placed within the box, the slot 32 thereof receiving the tab 25 of divider 24. The goods may now be inserted in the four compartments formed within the box. It will readily be comprehended that the smooth rolled edge 33 of the divider 24, formed by doubling over the parts of the outstanding portion 25 thereof, guide the contents of the goods into the various compartments so as to facilitate the packing of the same within the box. After the goods have been placed within the box, the other divider 24 is inserted between the same and with the outstanding portion 25 thereof within the slot 31 in divider 28. This leaves the base members 26 and 27 of said divider lying upon the top of the goods and upon the upper edge of the divider 28. Flaps 21 and 22 are next folded into closing position and to abut against the edges of the base members 26 and 27 of the upper divider and the flaps 19 and 20 are thereafter folded in place and glued to the flaps 21 and 22 and to one another. The box is then completely closed and ready for shipment.

Figure 3:
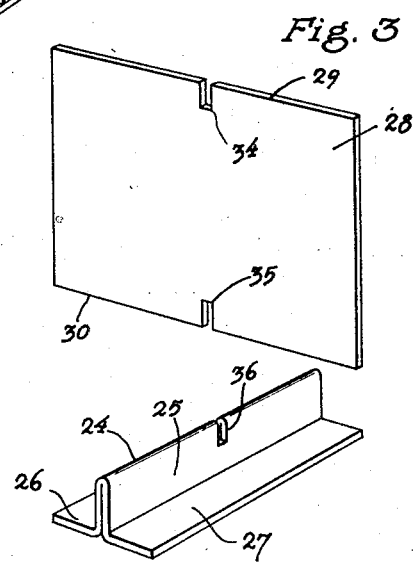
Fig. 3 is a view similar to Fig. 2 showing a modification of the structure illustrated in Fig. 2.

In Fig. 3 I have shown a modification of the invention in which the divider 28 is formed with slots 34 and 35 of a length equal to substantially one-half the length of slots 31 and 32. In this form of the invention, the divider 24 is likewise formed with slots 36 of a length substantially equal to the length of the slots 34 and 35, so that when the two dividers are placed in intersecting relation, both dividers assist in holding each other in upright position. The form of the invention shown in Fig. 3 is particularly advantageous when the height of the box is considerable as displacement of the upper portion of the divider 28 is thereby prevented.

Figure 4:
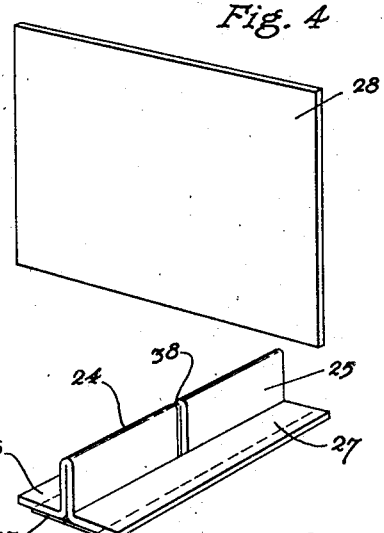
Fig. 4 is a view similar to Fig. 2, showing still another form of dividers.

If desired, the slot may be formed solely in the divider 24 as shown in Fig. 4 at 38, the divider 28 being constructed of a plain sheet of material. In such case, the slot supports the divider 28 throughout its length, which is highly desirable when the height of the box is great. Where the base members 26 and 27 of this divider are snugly received within the space 23 of the box, the parts of the outstanding portion or tab 25 are held together thereby. Where, however, the space 23 would be wider than the combined width of base members 26 and 27, the same would tend to spring apart, due to the absence of means on the divider 28 for holding them together. To overcome this objection, a strip of adhesive paper 37 may be glued to the underside of the base members 26 and 27 of divider 24 to hold the parts of the tab 25 together.

Figure 5:
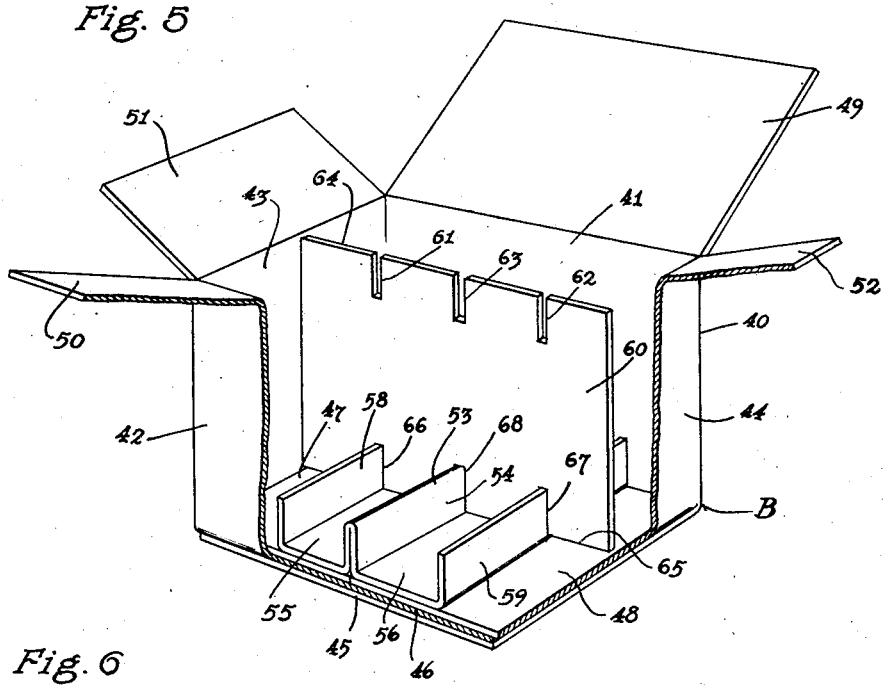
Fig. 5 is a perspective view of a box similar to that shown in Fig. 1 and illustrating another form of dividers applied to the box.
Figure 6:
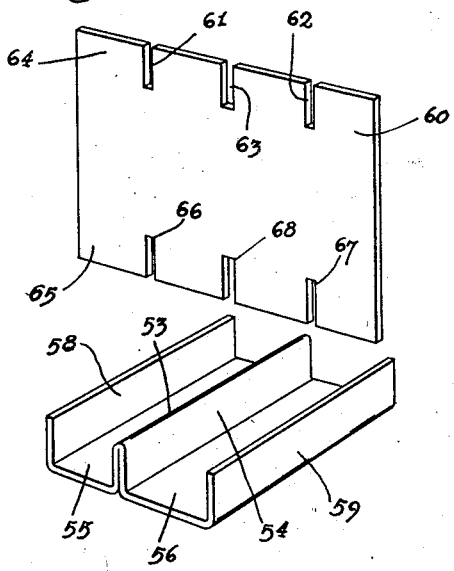
Fig. 6 is a perspective view of the dividers shown in Fig. 5 detached from the box and separated from one another.

In Fig. 5, I have shown a box designated at B and forming eight compartments instead of four as illustrated in Fig. 1. The box shown in this form of the invention is similar to that shown in Fig. 1 and comprises a body portion 40 having side walls 41 and 42 and end walls 43 and 44. Issuing outwardly from these various walls are flaps 45, 46, 47, 48, 49, 50, 51 and 52, which, like the flaps on the other box are foldable into common planes to form a bottom and closure for the box. It will be noted however, that the flaps 47 and 48 and the flaps 51 and 52 are of a length substantially equal to half the length of the box so that said flaps meet in the middle of the box. This is particularly advantageous in a fairly large box, which would be the case where eight compartments were being formed instead of only four as in the other form of the invention.

In the form of the invention shown in Fig. 5, two dividers, designated at 53, are employed which take the place of the dividers 24. These dividers are formed with a doubled over outstanding portion or tab 54, which has connected to it, two base members 55 and 56 adapted to lie in a common plane when the divider is erected. Along the edges of the base members 55 and 56 are formed outstanding tabs 58 and 59 which lie parallel to the tab 54 but which are constructed of a single thickness of material. In conjunction with the dividers 53, another divider 60 is employed, which is similar to the divider 28 of box A. This divider is of a length and height equal to the interior length and height of the box and is provided at the upper edge 64 thereof with slots 61 and 62, equal to the thickness of tabs 58 and 59 and of a height equal to the height of tabs 58 and 59. This divider is further formed along the edge 54 with an intermediate slot 63 of a width equal to the combined thickness of the parts of the tab 54 and of the same height. In like manner, the lower edge 65 of the divider 60 is constructed with slots 66, 67 and 68, which correspond with the slots 61, 62 and 63. In this form of the invention, the divider 60, besides holding the various tabs of the dividers 53 in outright position, also center the said divider with respect to the box, so that the cans or articles to be packed within the box may be readily placed within the various compartments formed therein. The method of using this form of the invention is exactly the same as that of the box shown in Fig. 1.

Figure 7:
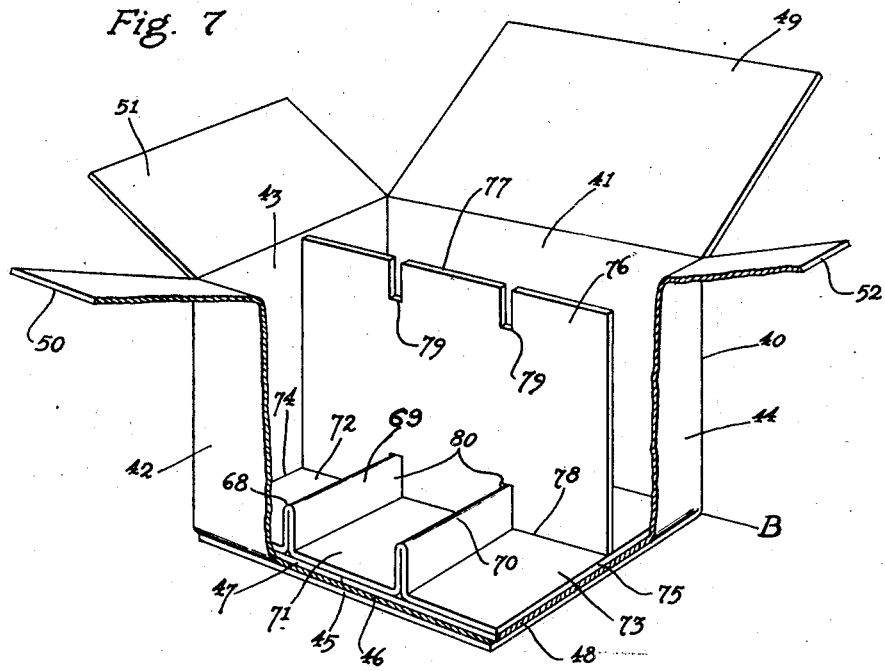
Fig. 7 is a view similar to Fig. 5 of a modification of the structure illustrated therein.
Figure 8:
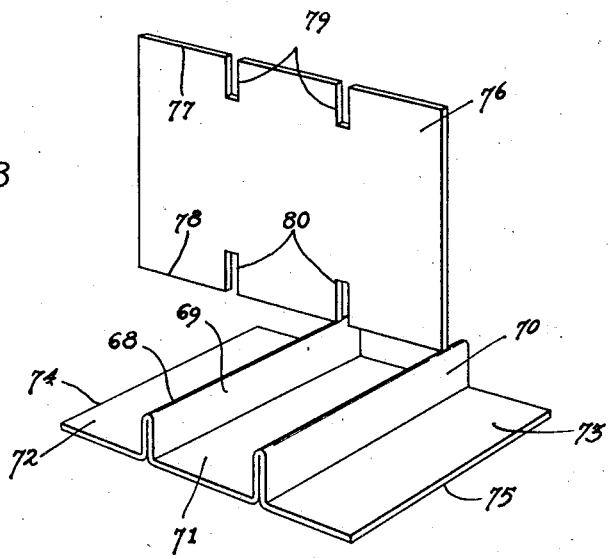
Fig. 8 is a view similar to Fig. 6 showing the dividers detached from the box and separated from one another.

If desired, the box B may be divided into six compartments instead of eight as shown in Figs. 7 and 8. Also the tabs of the dividers may be all formed with doubled over parts instead of the outer of the tabs being left with raw edges as shown in Fig. 5. In this case, a divider 68 is employed which is formed of a single sheet of material folded to provide two doubled over outstanding portions or tabs 69 and 70, connected together by an intermediate base portion 71 and outlying base portions 72 and 73 all disposed in a common plane. The combined length of the base portions 71, 72 and 73 may be equal to the length of the box, so that the edges 74 and 75 of the base members 72 and 73 engage the end walls 43 and 44 of the box. In such case, the parts of the tabs 69 and 70 are held together independently of the second divider. With this form of the invention, a divider such as indicated at 76 is employed, which is formed along its upper and lower edges 77 and 78 with slots 79 and 80 of appropriate width and height to receive the respective tabs 69 and 70 of the two dividers 68. The divider 76 is of a height equal to the height of the box, though the same may be made of a length less than the length of the box in the case that round cans are to be packed in the box. Although the form of the invention shown in Fig. 5 has been illustrated with the two outer tabs having raw edges, it can readily be comprehended that the divider 53 can be constructed similar to the divider 68 with all of the tabs having doubled over parts and with or without the outlying base members. Also the dividers 68, shown in Fig. 8, may be constructed without the base members 72 and 73, in which case, the divider 76 would be constructed of a length equal to the length of the box.

My invention is particularly advantageous in that an extremely economical box construction is provided in which the goods packed are amply protected. The goods or objects to be packed within the box may be readily placed within the same and due to the construction of the edges of the tabs forming the dividing means in the box, the goods readily slide into their various compartments. The various dividers are readily detachable from the box and are held in position when applied to the box. The dividers used with the box aid in stiffening and reinforcing the same. The box can be divided into any number of compartments. The goods are particularly well cushioned at the top and bottom of the box where the load on the box might be the greatest.

Changes in the specific form of my invention as herein disclosed may be made within the scope of what is claimed, without departing from the spirit of my invention.

Having described my invention, what I claim as new and desire to protect by Letters Patent is:

1. A box comprising a walled body portion, a divider having a base portion of a width less than the width of the box and resting upon one of the walls thereof, another divider intersecting said first named divider and extending at right angles thereto, said second named divider being of a length substantially equal to the length of the box, a slot in said second named divider for engaging said first named divider, said slot operating to retain said first named divider in a position intermediate the sides of the box, said second named divider resting upon the base of said first named divider.

2. A box comprising a walled body portion, a divider formed of a sheet of material doubled back upon itself to provide an upstanding two fold portion and base members issuing outwardly therefrom, said base members being adapted to rest upon one of the walls of the box and being of a total width less than the length of the box, a second divider extending across said first divider and at right angles thereto, said second divider having a slot therein for the reception of the upstanding portion of said first named divider, said slot serving to hold the portions of said first named divider together and to hold the first named divider in proper position intermediate the sides of the box.

3. A box comprising a walled body portion, a divider formed of a sheet of material doubled back upon itself to provide an upstanding two fold portion and base members issuing outwardly therefrom, and other upstanding portions spaced from the first named upstanding portions and disposed on either side thereof, said base members of the divider resting on one of the walls of the box with the upstanding portions thereof spaced from the sides of the box, a second divider extending across said first named dividers and having slots therein for engagement with the upstanding portions of said first named divider, said slots holding the portions of the intermediate divider together and holding the upstanding portions of the divider at right angles to the base thereof and also holding the entire divider in proper position intermediate the sides of the box.

4. A box comprising a walled body portion, a divider formed of a sheet of material doubled back upon itself to provide a tab extending outwardly therefrom and base members issuing from said tab on either side thereof, said base members being of a combined length equal to the length of the box and being adapted to engage the ends of the box when placed upon one of the walls thereof and a second divider extending at right angles to said first named divider, said second named divider having a slot therein adapted to receive said tab, said divider resting upon the base members of said first named divider and serving to hold said base members in contact with the wall of the box on which they rest.

5. A box comprising a walled body portion, a divider formed of a sheet of material doubled back upon itself to provide at spaced localities, two outstanding tabs to further provide an intermediate base portion and base portions on either side of said tabs, the combined width of said base portions being substantially equal to the length of the box and a second divider extending across said first named divider and having slots for the reception of said outstanding tabs, said slots holding said tabs at right angles to the base members and holding said base members in contact with the wall of the box on which they rest.

6. A box comprising a walled body portion, a divider within said box constructed of sheet metal and doubled back upon itself to provide an outstanding portion and a pair of base members issuing therefrom and adapted to lie in a common plane, means on said box for engaging the edges of said base members to hold the double over parts of said outstanding portion in a common plane and a second divider extending across said first divider and having a slot therein for engagement with said outstanding portion to hold the same at right angles to said base members.

7. A box comprising a walled body portion, two dividers within the box each comprising an outstanding portion and a base portion, said base portions resting upon opposite walls of the box, and a second divider disposed within the box with opposite edges engaging the bases of said first named dividers and holding the same in contact with the walls of the box upon which they rest.

8. A box comprising a walled body portion, a divider within the box constructed of sheet material, doubled back upon itself to provide an outstanding portion and base members connected therewith and disposed upon one of the walls of the box, and a second divider having a slot for the reception of the doubled over outstanding portion of said first named divider, the doubled over edge of said first named divider lying innermost within said slot.

In testimony whereof I have affixed my signature.

PAUL F. BOEYE.